(12) United States Patent
Imai et al.

(10) Patent No.: US 8,368,332 B2
(45) Date of Patent: Feb. 5, 2013

(54) MOTOR DRIVING CIRCUIT

(75) Inventors: Toshiyuki Imai, Oizumi-machi (JP); Hiroyuki Kikukawa, Ota (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 211 days.

(21) Appl. No.: 13/033,387

(22) Filed: Feb. 23, 2011

(65) Prior Publication Data

US 2011/0204834 A1    Aug. 25, 2011

(30) Foreign Application Priority Data

Feb. 23, 2010    (JP) .................................. 2010-037791

(51) Int. Cl.
*H02P 6/16*    (2006.01)

(52) U.S. Cl. ................... 318/400.26; 318/432; 318/431; 318/400.1; 318/400.3; 388/903; 388/907.5

(58) Field of Classification Search .................. 318/286, 318/280, 431, 432, 434, 445, 400.26, 400.1, 318/400.3
See application file for complete search history.

(56) References Cited

U.S. PATENT DOCUMENTS

| | | | | |
|---|---|---|---|---|
| 4,054,820 A | * | 10/1977 | Foster | 318/603 |
| 4,510,422 A | * | 4/1985 | Ogura | 318/400.1 |
| 5,061,884 A | * | 10/1991 | Saganovsky | 318/431 |
| 5,285,145 A | * | 2/1994 | Minowa et al. | 318/808 |
| 6,194,856 B1 | * | 2/2001 | Kobayashi et al. | 318/432 |
| 6,804,130 B2 | * | 10/2004 | Morimoto | 363/132 |
| 6,856,112 B2 | * | 2/2005 | Ohshima | 318/286 |
| 6,867,563 B2 | * | 3/2005 | Ohshima | 318/434 |
| 7,002,309 B2 | * | 2/2006 | Ohshima | 318/286 |
| 7,015,665 B2 | * | 3/2006 | Ohshima | 318/280 |
| 7,030,584 B1 | * | 4/2006 | Alberkrack | 318/400.03 |
| 7,064,510 B2 | * | 6/2006 | Brannen et al. | 318/400.3 |
| 7,148,642 B2 | * | 12/2006 | Brannen et al. | 318/400.06 |

(Continued)

FOREIGN PATENT DOCUMENTS

| | | |
|---|---|---|
| JP | 6-351285 A | 12/1994 |
| JP | 11-098885 A | 4/1999 |

(Continued)

OTHER PUBLICATIONS

Office Action issued in corresponding Korean Application No. 10-2011-15627 dated Jun. 19, 2012 and English translation thereof (6 pages).

*Primary Examiner* — Paul Ip
(74) *Attorney, Agent, or Firm* — Osha Liang LLP

(57) ABSTRACT

A motor-driving circuit includes: a plurality of output transistors; a first-comparator circuit to compare a voltage of each phase of driving coils of a plurality of phases in a motor, with a neutral-point voltage; a position-detecting circuit to detect a rotor position of the motor based on a comparison result of the first-comparator circuit; a switching-control circuit to supply switching signals to the plurality of output transistors according to the rotor position; and a current-limiting circuit to limit the driving currents to a first-current value so that the motor rotates at a target-rotation speed when the current-limiting circuit determines that the motor is rotating at a speed higher than or equal to a predetermined-reference-rotation speed, and limit the driving currents to a second-current value smaller than the first-current value when the current-limiting circuit determines that the motor is not rotating at the speed higher than or equal to the predetermined-reference-rotation speed.

5 Claims, 4 Drawing Sheets

U.S. PATENT DOCUMENTS

| | | | |
|---|---|---|---|
| 7,276,867 B2* | 10/2007 | Alberkrack et al. | 318/400.24 |
| 2004/0052097 A1* | 3/2004 | Morimoto | 363/55 |
| 2004/0104701 A1* | 6/2004 | Ohshima | 318/445 |
| 2004/0222759 A1* | 11/2004 | Ohshima | 318/286 |
| 2005/0116672 A1* | 6/2005 | Ohshima | 318/286 |
| 2006/0077606 A1* | 4/2006 | Nakamura | 361/93.1 |
| 2006/0097678 A1* | 5/2006 | Alberkrack et al. | 318/439 |
| 2011/0163730 A1* | 7/2011 | Zhang et al. | 323/234 |

FOREIGN PATENT DOCUMENTS

| | | |
|---|---|---|
| JP | 2000-152687 A | 5/2000 |
| JP | 2000350490 A | 12/2000 |
| JP | 2002142484 A | 5/2002 |
| JP | 2008259340 A | 10/2008 |

* cited by examiner

MOTOR DRIVING CIRCUIT

CROSS-REFERENCE TO RELATED APPLICATION

This application claims the benefit of priority to Japanese Patent Application No. 2010-037791, filed Feb. 23, 2010, of which full contents are incorporated herein by reference.

BACKGROUND OF THE INVENTION

1. Field of the Invention

The present invention relates to a motor driving circuit.

2. Description of the Related Art

A sensorless method, which does not require a position detecting device such as a Hall element, is known as a driving method for a brushless DC motor which includes driving coils of a plurality of phases (e.g., three phases). In the sensorless method, a counter electromotive force which is generated in each of the driving coils is used, and a voltage of each of the driving coils of the phases is compared with a voltage of a neutral point, so that a position of a rotor (rotator) can be detected.

In addition to a PWM (Pulse Width Modulation) method, a PAM (Pulse Amplitude Modulation) method disclosed in Japanese Laid-Open Patent Publication Nos. 2000-350490, 2002-142484, and 2008-259340 is known as a control method of output transistors that supply driving currents to the driving coils, for example. According to the PAM method, a pulse-amplitude-modulated switching signal is supplied to the output transistors.

FIG. 4 depicts an example of a configuration of a common motor driving circuit configured to drive a sensorless three-phase motor by the PAM method.

In a motor driving circuit 1b depicted in FIG. 4, a comparator circuit 21 compares voltages U, V, and W of the phases of driving coils 61 to 63 with a voltage COM of a neutral point. A position detecting circuit 11 detects the position of a rotor of a motor 6 based on a comparison result signal CMP. A switching control circuit 12 generates switching signals S41 to S43 and S51 to S53, which are pulse-amplitude-modulated according to a rotor position signal RP, and supplies the switching signals to output transistors 41 to 43 and 51 to 53, respectively. The output transistors supply driving currents to the driving coils 61 to 63, and the current value of the driving currents is detected as a voltage RF.

In the motor driving circuit 1b, a comparator circuit 14 compares the voltage RF with a voltage V1, and outputs a current limit signal LMT. The switching control circuit 12 limits the amplitude of each of the switching signals according to the current limit signal LMT, and limits the driving currents to a predetermined current value. Therefore, the comparator circuit 14 functions as a current limiting circuit that limits the driving currents, so that the motor driving circuit 1b can rotate the motor 6 at a target rotation speed.

In this manner, the sensorless three-phase motor can be driven in the PAM method and can be rotated at the target rotation speed.

The sensorless motor driving circuit is not able to detect the position of the rotor at the time of startup. Therefore, the switching control circuit generates predetermined switching signals so that predetermined startup currents are supplied as the driving currents. When the motor starts to be rotated by the startup currents, the position of the rotor can be detected, and therefore, the switching control circuit generates the switching signal corresponding to the position of the rotor.

However, when the target rotation speed of the motor is set at a high speed, great startup currents are supplied to the driving coils, and therefore, the motor may start to rotate at a speed faster than a speed of the switching timings of the switching signals. Therefore, the motor may lose its synchronization or may rotate in the reverse direction at the time of startup.

SUMMARY OF THE INVENTION

A motor driving circuit according to an aspect of the present invention, includes: a plurality of output transistors configured to supply driving currents to driving coils of a plurality of phases in a motor; a first comparator circuit configured to compare a voltage of each of the phases of the driving coils of the plurality of phases, with a voltage of a neutral point of the driving coils of the plurality of phases; a position detecting circuit configured to detect a position of a rotor of the motor based on a comparison result obtained by the first comparator circuit; a switching control circuit configured to generate switching signals which are pulse-amplitude-modulated according to the position of the rotor, and to supply the switching signals to the plurality of output transistors; and a current limiting circuit configured to determine whether or not the motor is rotating at a speed higher than or equal to a predetermined reference rotation speed based on a position of the rotor, the predetermined reference rotation speed being lower than or equal to a target rotation speed, limit the driving currents to a first current value so that the motor rotates at the target rotation speed when the current limiting circuit determines that the motor is rotating at a speed higher than or equal to the predetermined reference rotation speed, and limit the driving currents to a second current value smaller than the first current value when the current limiting circuit determines that the motor is not rotating at the speed higher than or equal to the predetermined reference rotation speed.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Configuration of Whole of Motor Driving Circuit

A description will hereinafter be given of a configuration of the whole of a motor driving circuit according to a first embodiment of the present invention with reference to FIG. 1.

Figure 1:
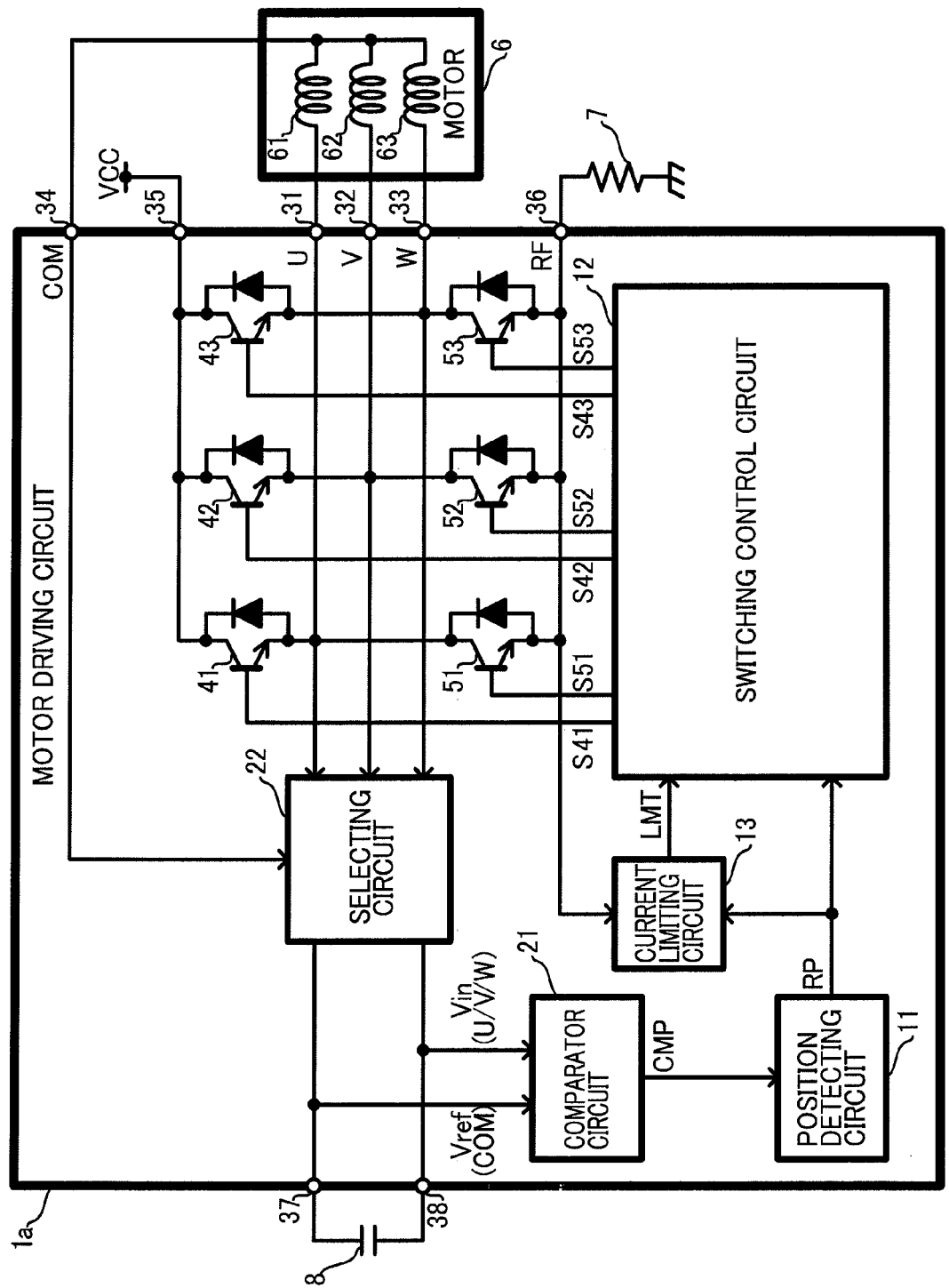
FIG. 1 is a circuit block diagram illustrating a configuration of the whole of a motor driving circuit according to a first embodiment of the present invention.

A motor driving circuit 1a depicted in FIG. 1 is a circuit that is configured to drive a sensorless motor 6, using the PAM method, which includes driving coils 61 to 63 of three phases, and that is configured as an integrated circuit which includes terminals 31 to 38. The motor driving circuit 1a includes a position detecting circuit 11, a switching control circuit 12, a current limiting circuit 13, a comparator circuit 21, a selecting circuit 22, and output transistors 41 to 43 and 51 to 53. The motor driving circuit 1a is connected to a resistor 7 and a capacitor 8 in addition to the motor 6.

As an example of the output transistors, hereinafter, a description will be given of a case of employing NPN transistors in which each diode is connected in inverse parallel manner. The phases of the driving coils 61 to 63 are respectively denoted by "U-phase", "V-phase", and "W-phase".

Collectors of the output transistors 41 to 43 on a high side (power source side) are all connected to a power source potential VCC through the terminal 35. Emitters of the output transistors 51 to 53 on a low side (ground side) are all connected to a ground potential through the resistor 7 which is externally connected to the terminal 36. The output transistors 41 to 43 are connected in series to the output transistors 51 to 53, respectively. Connecting points thereof are connected to the terminals 31 to 33, respectively. The terminals 31 to 33 are connected to the driving coils 61 to 63, respectively. The neutral point of the driving coils 61 to 63 is connected to the terminal 34.

Respective voltages U, V, W, and COM of the terminals 31 to 34 are input to the selecting circuit 22. An input voltage Vin and a reference voltage Vref are input to the (first) comparator circuit 21 from the selecting circuit 22. The capacitor 8 is externally connected between signal lines of the input voltage Vin and the reference voltage Vref through the terminals 37 and 38. The comparator circuit 21 outputs a comparison result signal CMP.

The comparison result signal CMP is input to the position detecting circuit 11 and the position detecting circuit 11 outputs the rotor position signal RP. The rotor position signal RP and the voltage RF of the terminal 36 are input to the current limiting circuit 13, and the current limiting circuit 13 outputs the current limit signal LMT. The configuration of the current limiting circuit 13 will be described later in detail.

The rotor position signal RP and the current limit signal LMT are input to the switching control circuit 12. The switching signals S41 to S43 and S51 to S53, which are output from the switching control circuit 12, are respectively input to bases of the output transistors 41 to 43 and 51 to 53.

Operation of Whole of Motor Driving Circuit

A description will be given of an operation of the whole of the motor driving circuit according to an embodiment of the present invention.

The output transistors 41 to 43 and 51 to 53 are controlled as to switching thereof according to the switching signals S41 to S43 and S51 to S53, and supply driving currents to driving coils 61 to 63 of the motor 6.

For example, when the output transistors 41 and 52 are on, the driving currents flow from the power source potential VCC to the ground potential through the output transistor 41, the driving coils 61 and 62, the output transistor 52, and the resistor 7. Therefore, in this case, the driving currents flow from the U-phase to the V-phase. For example, when the output transistors 43 and 52 are on, the driving currents flow from the W-phase to the V-phase. The current value of the driving currents is detected as the voltage RF.

The selecting circuit 22 sequentially selects any one of the respective voltages U, V, and W of the terminals 31 to 33 (U-phase, V-phase, and W-phase), and inputs the selected voltage to the comparator circuit 21 as the input voltage Vin. The selecting circuit 22 inputs the voltage COM of the terminal 34 (the neutral point of the driving coils 61 to 63) to the comparator circuit 21 as the reference voltage Vref. The capacitor 8 is connected between the signal lines of the input voltage Vin and the reference voltage Vref, so as to act as a filter for removing noise in the input signal of the comparator circuit 21. The comparator circuit 21 compares the input voltage Vin with the reference voltage Vref, and outputs the comparison result as the comparison result signal CMP which is a binary signal.

The position detecting circuit 11 detects the position of the rotor of the motor 6 based on the comparison result signal CMP, and outputs the rotor position signal RP indicating one or more predetermined position(s) of the rotor during its one rotation. The current limiting circuit 13 outputs the current limit signal LMT according to the rotation speed of the motor 6, which is acquired from the rotor position signal RP, and the current value of the driving currents, which is indicated by the voltage RF. The operation of the current limiting circuit 13 will be described later in detail.

The switching control circuit 12 generates the switching signals S41 to S43 and S51 to S53 that are pulse-amplitude-modulated according to the rotor position signal RP, and supplies those signals to the output transistors 41 to 43 and 51 to 53, respectively. The switching control circuit 12 limits the amplitude of each of the switching signals according to the current limit signal LMT, so as to limit the driving currents.

As such, the motor driving circuit 1a limits the amplitude of each of the switching signals, to limit the driving currents, so that the motor 6 can be rotated at the target rotation speed.

Configuration of Current Control Circuit

A description will be given, with reference to FIG. 2, of the configuration of the current control circuit according to an embodiment of the present invention.

Figure 2:
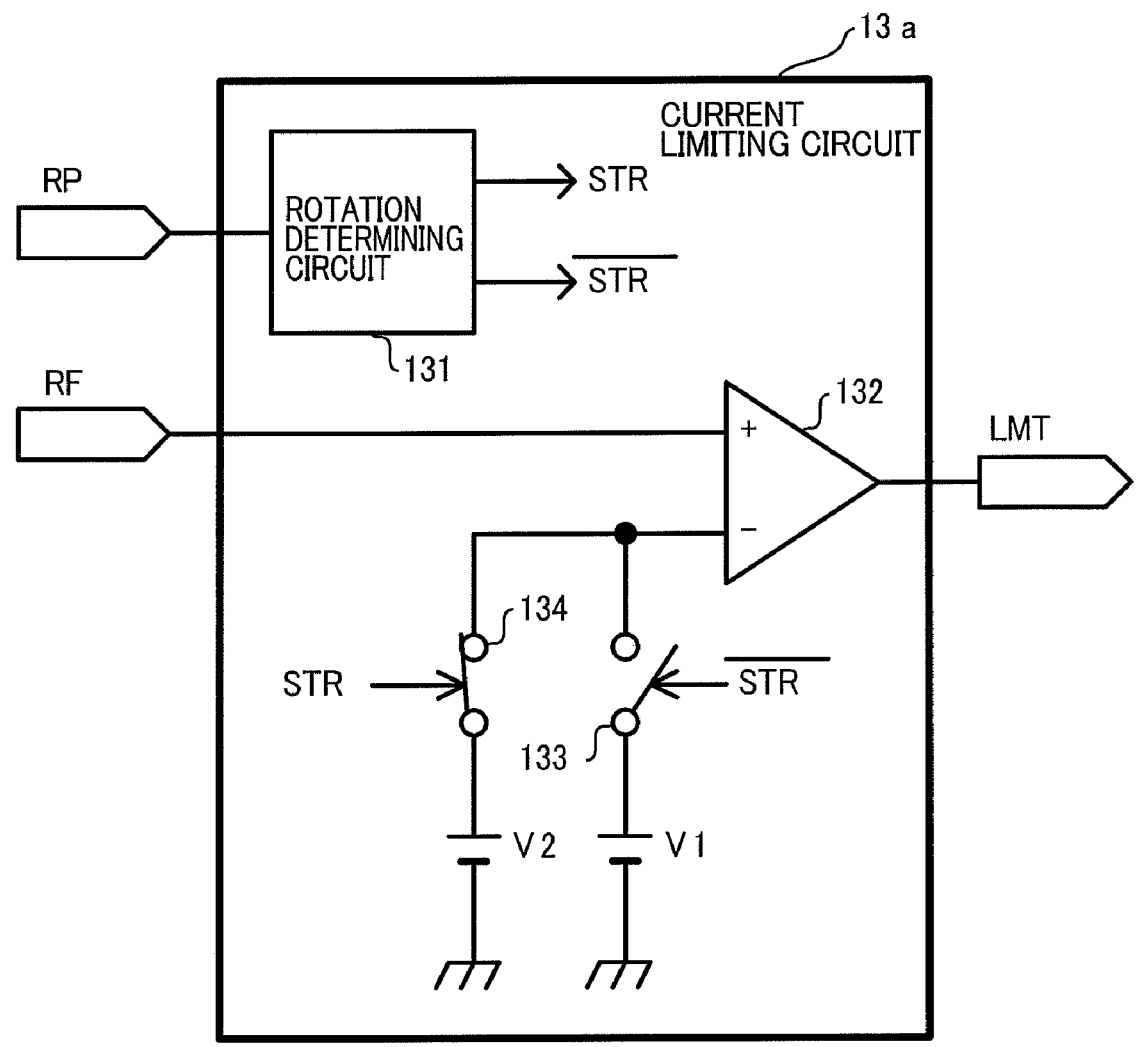
FIG. 2 is a circuit block diagram illustrating a configuration of a current limiting circuit according to a first embodiment of the present invention.

A current limiting circuit 13a depicted in FIG. 2 includes a rotation determining circuit 131, a comparator circuit 132, and switching circuits 133 and 134. In an embodiment of the present invention, the switching circuits 133 and 134 correspond to a voltage output circuit.

The rotor position signal RP is input to the rotation determining circuit 131. A startup mode signal STR and its inverted signal which is output from the rotation determining circuit 131 are control signals for controlling the switching circuits 133 and 134 as to ON/OFF, respectively. An end of each of the switching circuits 133 and 134 is connected to an inverting input of a (second) comparator circuit 132, and the other ends of the switching circuits 133 and 134 are applied with a (first) voltage V1 and a (second) voltage V2, respectively. A non-inverting input of the comparator circuit 132 is applied with the voltage RF. The comparator circuit 132 outputs the current limit signal LMT.

Operation of Current Limiting Circuit

A description will be given of the operation of the current limiting circuit according to an embodiment of the present invention.

The rotation determining circuit 131 determines whether the motor 6 is rotating at a speed higher than or equal to a predetermined reference rotation speed, based on the rotation speed of the motor 6 which is acquired from the rotor position signal RP. The reference rotation speed is set to be within a range of a speed lower than or equal to the target rotation speed of the motor 6, and is the criterion for determining whether the motor 6 is normally rotating.

The rotation speed of the motor 6 can be detected as a voltage by smoothing the rotor position signal RP using an integrating circuit (low pass filter), for example, and can also be detected as a frequency using VCO (Voltage-Controlled Oscillator), for example, which is controlled by the above voltage. The rotation determining circuit 131 sets the startup mode signal STR to be at a low level (low) while the motor 6 is normally rotating (i.e., rotating at a speed higher than or equal to a reference rotation speed), and to be at a high level (high) while the motor 6 is not normally rotating, e.g., at the time of starting up, for example.

When the startup mode signal STR is at the low level, the switching circuit 133 is on and the switching circuit 134 is off. Therefore, the comparator circuit 132 outputs the current limit signal LMT that is at the high level when the voltage RF is higher than or equal to the voltage V1. The driving currents to be supplied to the driving coils 61 to 63 are limited to a first current value which corresponds to the voltage V1, so that the motor 6 rotates at the target rotation speed.

On the other hand, as depicted in FIG. 2, when the startup mode signal STR is at the high level, the switching circuit 133 is off and the switching circuit 134 is on. Therefore, the comparator circuit 132 outputs the current limit signal LMT that is at the high level when the voltage RF is higher than or equal to the voltage V2. The voltage V2 is set at a voltage which is lower than the voltage V1. Therefore, the driving currents to be supplied to the driving coils 61 to 63 are limited to a second current value which corresponds to the voltage V2 and is smaller than the first current value.

In this manner, while the motor 6 is not normally rotating, e.g., at the time of starting up, for example, the current limiting circuit 13a according to an embodiment of the present invention limits the driving currents to a current value which is smaller than the current value while the motor 6 is normally rotating. Therefore, at the time of starting up of the motor 6, the target rotation speed of the motor 6 can substantially be suppressed to a low speed, and a loss of the synchronization and a reverse rotation can be suppressed.

Second Embodiment

Configuration of Current Limiting Circuit

The configuration and the operation of the whole of a motor driving circuit according to a second embodiment of the present invention is substantially the same as the configuration and the operation of the whole of the motor driving circuit according to a first embodiment thereof. However, in the motor driving circuit according to an embodiment of the present invention, a switching cycle signal CYC is further input from the switching control circuit to the current limiting circuit.

A description will hereinafter be given of the configuration of the current limiting circuit according to an embodiment of the present invention, with reference to FIG. 3.

Figure 3:
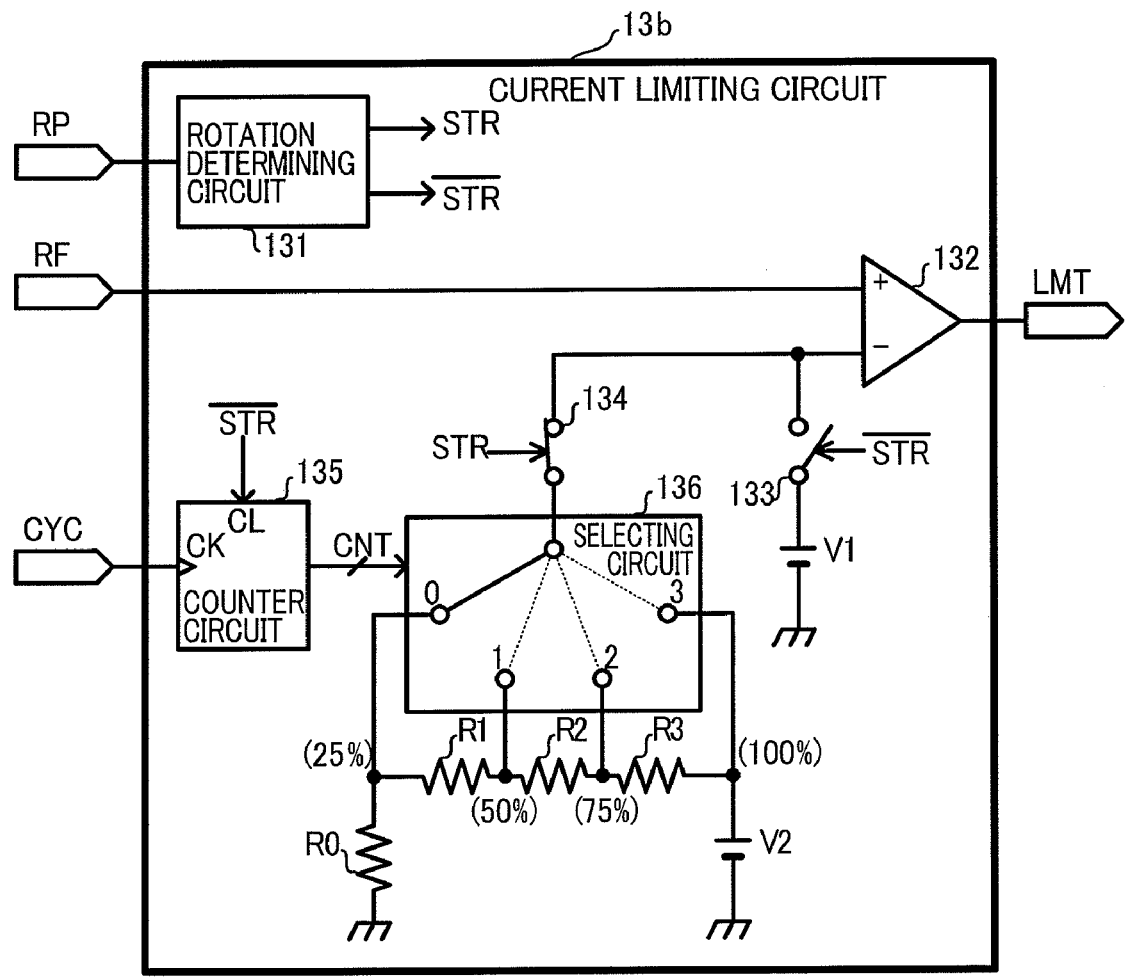
FIG. 3 is a circuit block diagram illustrating a configuration of a current limiting circuit according to a second embodiment of the present invention.
Figure 4:
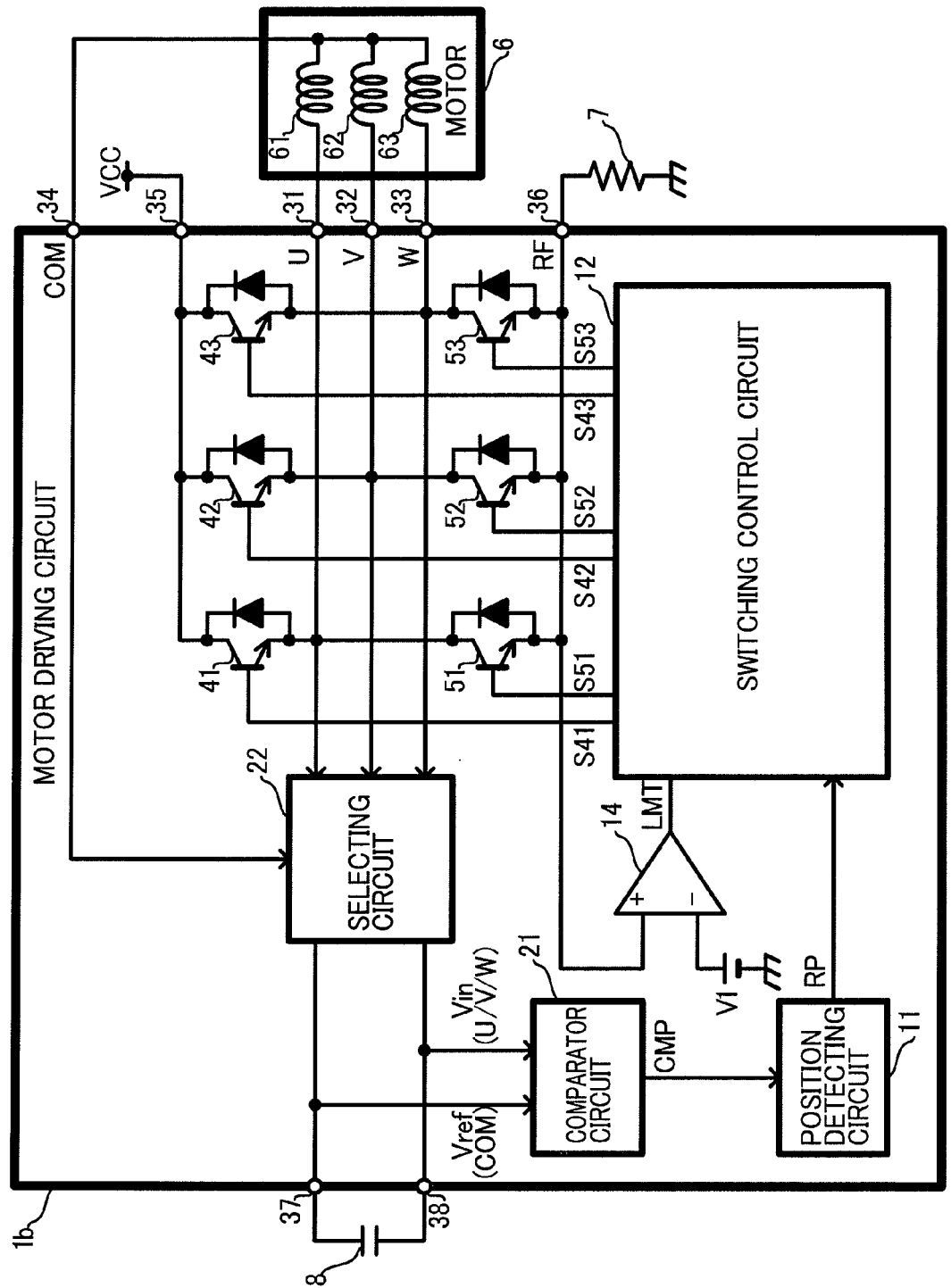
FIG. 4 is a circuit block diagram illustrating an example of a configuration of the whole of a common motor driving circuit including a current limiting circuit.

A current control circuit 13b depicted in FIG. 3 includes the rotation determining circuit 131, the comparator circuit 132, the switching circuits 133 and 134, a counter circuit 135, a selecting circuit 136, and resistors R0 to R3. In an embodiment of the present invention, the switching circuits 133 and 134, the counter circuit 135, the selecting circuit 136, and the resistors R0 to R3 correspond to the voltage output circuit.

The counter circuit 135 is configured as a quaternary counter. The switching cycle signal CYC is input to a CK input (clock input) of the counter circuit 135 and an inverted signal of the startup mode signal STR is input to a CL input (clear input) thereof. The counter circuit 135 outputs a count value CNT.

The resistors R0 to R3 are connected in series in this order. An end of the resistor R0 and that of the resistor R3 are respectively connected to a ground potential and a potential V2. The resistance values of the resistors R0 to R3 are equal to each other. It is assumed that the voltages of the connecting points of the resistors are voltages which are 25%, 50%, and 75% of the voltage V2, respectively.

The selecting circuit 136 is configured as a multiplexer having four inputs and one output, and the count value CNT of the counter circuit 135 is input to a selection control input thereof. Data inputs thereof corresponding to CNT=0 to 2 are connected to connecting points of the resistors. A data input thereof corresponding to CNT=3 is connected to the potential V2.

Similarly to the current limiting circuit 13a according to a first embodiment of the present invention, the rotor position signal RP is input to the rotation determining circuit 131. The startup mode signal STR and the inverted signal thereof, which are output from the rotation determining circuit 131 are respectively control signals for controlling the switching circuits 133 and 134 as to on/off. An end of each of the switching circuits 133 and 134 is connected to the inverting input of the (second) comparator circuit 132.

The other end of the switching circuit 133 is applied with the (first) voltage V1. On the other hand, the other end of the switching circuit 134 is connected to an output of the selecting circuit 136. Therefore, in an embodiment of the present invention, an output voltage of the selecting circuit 136 corresponds to a second voltage. The non-inverting input of the comparator circuit 132 is applied with the voltage RF and the comparator circuit 132 outputs the current limit signal LMT.

Operation of Current Limiting Circuit

A description will be given of the operation of the current limiting circuit in an embodiment of the present invention will be described.

Similarly to the current limiting circuit 13a according to a first embodiment of the present invention, the rotation determining circuit 131 sets the startup mode signal STR to be at the low level while the motor 6 is normally rotating, and sets the startup mode signal STR to be at the high level while the motor 6 is not normally rotating. When the startup mode signal STR is at the low level, the switching circuit 133 is on and the switching circuit 134 is off. Therefore, the comparator circuit 132 outputs the current limit signal LMT, which is at the high level when the voltage RF is higher than or equal to the voltage V1. The driving currents to be supplied to the driving coils 61 to 63 are limited to the first current value which corresponds to the voltage V1, so that the motor 6 rotates at the target rotation speed.

On the other hand, as depicted in FIG. 3, when the startup mode signal STR is at the high level, the switching circuit 133 is off and the switching circuit 134 is on. The counter circuit 135 starts counting in response to the switching cycle signal CYC. The count value CNT is sequentially increased from 0 to 3.

The switching cycle signal CYC is a signal indicating the cycle of each switching signal and is a pulse signal for each six-step cycle for the rotor of the motor 6 to perform one rotation, for example. In this case, the count value CNT of the counter circuit 135 is sequentially increased in such each six-step cycle, and the output voltage of the selecting circuit 136 sequentially is increased from a voltage equal to 25% of the voltage V2 to a voltage equal to 100% thereof by 25% thereof each time according to the count value CNT.

The comparator circuit 132 outputs the current limit signal LMT, which is at the high level when the voltage RF is higher than or equal to the output voltage (the second voltage) of the selecting circuit 136 which voltage gradually increases according to the cycle of the switching signal as such. Therefore, the driving currents to be supplied to the driving coils 61 to 63 are limited to a second current value, which gradually increases with the increase in the second voltage.

As described above, the current limiting circuit 13a according to a first embodiment of the present invention limits the driving currents to the predetermined current value, while the motor 6 is not normally rotating, e.g., at the time of starting up, so that the rotation speed of the motor 6 is suppressed to a low speed. Therefore, the motor 6 may not be able to fully rotate depending on the load at the starting up of the motor 6. When the current value, to which the driving currents are limited, is increased in order to support the starting up under a heavy load, loss of the synchronization and a reverse rotation can not be suppressed when the motor 6 is started up under a light load.

On the other hand, in the current limiting circuit 13b according to an embodiment of the present invention, the current value, to which the driving currents are limited, is gradually increased while the motor 6 is not normally rotating. Therefore, a wide range of loads from a light load to a heavy load can be supported, so that the motor 6 can be securely rotated when the motor 6 is started up under a heavy load and a loss of the synchronization and a reverse rotation can be suppressed when the motor 6 is started up under a light load.

As described above, in the motor driving circuit 1a which is configured to drive the sensorless three-phase motor 6 using the PAM method, when the motor 6 is not normally rotating, e.g., at the time of the starting up, the driving currents are limited to the second current value which is smaller than that of the driving currents used when the motor 6 is normally rotating. As a result, when the motor 6 is started up, the target rotation speed thereof can be substantially suppressed to a low speed, and therefore, a loss of the synchronization and a reverse rotation can be suppressed.

The motor driving circuit 1a detects that the voltage RF indicating the current value of the driving currents has reached the first voltage or the second voltage, and limits the amplitude of each of the switching signals. Thus, the driving currents can be limited.

The voltage RF is compared with the first voltage or the second voltage according to the determination result acquired as to whether or not the motor 6 is rotating at a speed higher than or equal to the predetermined reference rotation speed. As a result, the amplitude of each of the switching signals can be limited according to the comparison result.

The second voltage is gradually increased, so that a wide range of loads from a light load to a heavy load can be supported.

The second voltage is gradually increased according to the cycle of the switching signal, so that the second voltage can sufficiently slowly be increased with respect to the switching control at the time of the starting up of the motor 6.

For example, though the capacitor 8 is provided in order to remove noise, the capacitor 8 may be unnecessary depending on the state of noise generation.

The comparator 21 may be connected to the motor 6 not via the selecting circuit 22. In this case, the comparator is provided so as to support each of the phases.

In a second embodiment of the present invention, the second voltage is sequentially increased by 25% each time. However, this is not limitative. For example, the capacitor may be charged with a current having a constant value, so that the second voltage may gradually be increased with a constant slope. The voltage output circuit of the current limiting circuit 13b depicted in FIG. 3 is configured such that no capacitor is used, and therefore, the second voltage can sufficiently slowly be increased with respect to the switching control at the time of starting up of the motor 6, with the area of the circuit being reduced.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor driving circuit comprising:
 a plurality of output transistors configured to supply driving currents to driving coils of a plurality of phases in a motor;
 a first comparator circuit configured to compare a voltage of each of the phases of the driving coils of the plurality of phases, with a voltage of a neutral point of the driving coils of the plurality of phases;
 a position detecting circuit configured to detect a position of a rotor of the motor based on a comparison result obtained by the first comparator circuit;
 a switching control circuit configured to generate switching signals which are pulse-amplitude-modulated according to the position of the rotor, and to supply the switching signals to the plurality of output transistors; and
 a current limiting circuit configured to
  determine whether or not the motor is rotating at a speed higher than or equal to a predetermined reference rotation speed based on a position of the rotor, the predetermined reference rotation speed being lower than or equal to a target rotation speed,
  limit the driving currents to a first current value so that the motor rotates at the target rotation speed when the current limiting circuit determines that the motor is rotating at a speed higher than or equal to the predetermined reference rotation speed, and
  limit the driving currents to a second current value smaller than the first current value when the current limiting circuit determines that the motor is not rotating at the speed higher than or equal to the predetermined reference rotation speed.

2. The motor driving circuit of claim 1, wherein
 the current limiting circuit
  detects that a voltage indicating a current value of the driving currents has reached a first voltage indicating the first current value and outputs a current limit signal, when the current limiting circuit determines that the motor is rotating at a speed higher than or equal to the predetermined reference rotation speed, and
  detects that the voltage indicating a current value of the driving currents has reached a second voltage indicating the second current value and outputs the current limit signal, when the current limiting circuit determines that the motor is not rotating at a speed higher than or equal to the predetermined reference rotation speed, and wherein the switching control circuit limits the amplitude of the switching signal according to the current limit signal.

3. The motor driving circuit of claim 2, wherein
the current limiting circuit includes:
a rotation determining circuit configured to determine whether or not the motor is rotating at a speed higher than or equal to the predetermined reference rotation speed;
a voltage output circuit configured to output the first voltage or the second voltage according to a determination result obtained by the rotation determining circuit; and
a second comparator circuit configured to compare a voltage indicating a current value of the driving currents with an output voltage of the voltage output circuit.

4. The motor driving circuit of claim 3, wherein
the voltage output circuit gradually increases the second voltage, when the voltage output circuit outputs the second voltage.

5. The motor driving circuit of claim 4, wherein
the voltage output circuit gradually increases the second voltage in accordance with a cycle of the switching signal, when the voltage output circuit outputs the second voltage.

* * * * *